(12) United States Patent
Morin et al.

(10) Patent No.: US 12,517,492 B2
(45) Date of Patent: Jan. 6, 2026

(54) SYSTEM AND METHOD FOR MANUFACTURING A PART

(71) Applicant: PRATT & WHITNEY CANADA CORP., Longueuil (CA)

(72) Inventors: Philippe Morin, Beloeil (CA); Fabrizio Rojas, Sainte-Julie (CA); Rachid Guiassa, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 432 days.

(21) Appl. No.: 18/324,523

(22) Filed: May 26, 2023

(65) Prior Publication Data

US 2024/0393764 A1    Nov. 28, 2024

(51) Int. Cl.
G05B 19/4097    (2006.01)
G05B 19/41    (2006.01)

(52) U.S. Cl.
CPC ......... *G05B 19/4097* (2013.01); *G05B 19/41* (2013.01)

(58) Field of Classification Search
None
See application file for complete search history.

(56) References Cited

U.S. PATENT DOCUMENTS

| | | | |
|---|---|---|---|
| 10,466,681 B1 | 11/2019 | Jones et al. | |
| 10,817,526 B2 | 10/2020 | Jones et al. | |
| 10,831,179 B2 | 11/2020 | Byers et al. | |
| 10,871,764 B2 | 12/2020 | Nordell et al. | |
| 11,507,052 B2 | 11/2022 | Sykes et al. | |
| 2016/0070253 A1 | 3/2016 | Dunkin et al. | |
| 2018/0085877 A1 | 3/2018 | Agudelo | |
| 2023/0161314 A1* | 5/2023 | Guo | G06Q 10/0631 700/160 |

FOREIGN PATENT DOCUMENTS

| | | |
|---|---|---|
| EP | 2417498 B1 | 6/2013 |
| EP | 4184419 A1 | 5/2023 |
| TN | 2016000266 | 10/2017 |
| WO | 2018089252 | 5/2018 |

* cited by examiner

*Primary Examiner* — Ryan A Jarrett
(74) *Attorney, Agent, or Firm* — NORTON ROSE FULBRIGHT CANADA LLP

(57) ABSTRACT

The system can include a tool module executing a sequence of manufacturing process steps features of a part; a monitoring module generating manufacturing data segments describing the execution of the sequence of one or more manufacturing process steps; an associator module operable to construct one or more feature-based manufacturing data items using i) one or more sequence references indicating an order of the one or more manufacturing process steps in the sequence, and ii) an associator table having one or more feature identifiers of the one or more features associated to corresponding ones of the one or more sequence references, including matching the one or more manufacturing data segments with the one or more feature identifiers based on the one or more sequence references.

20 Claims, 16 Drawing Sheets

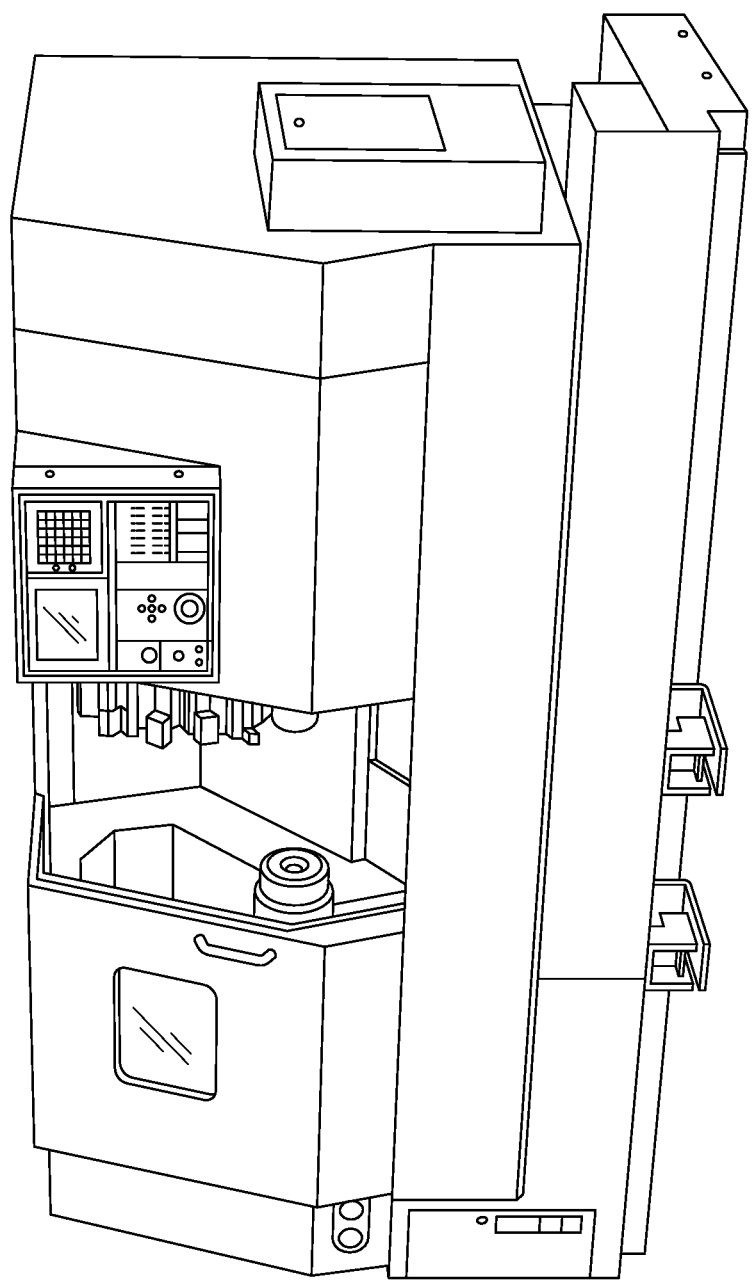

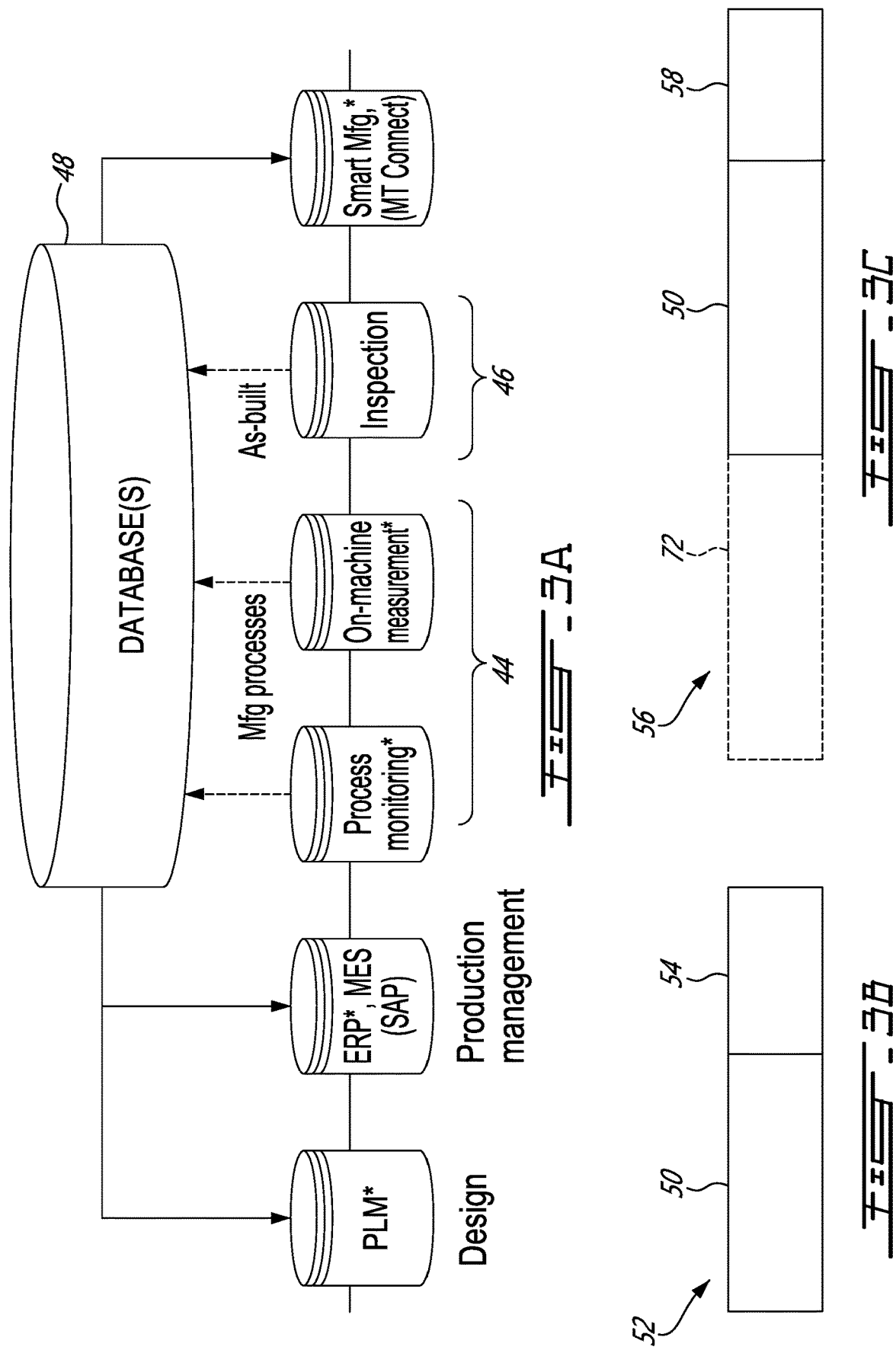

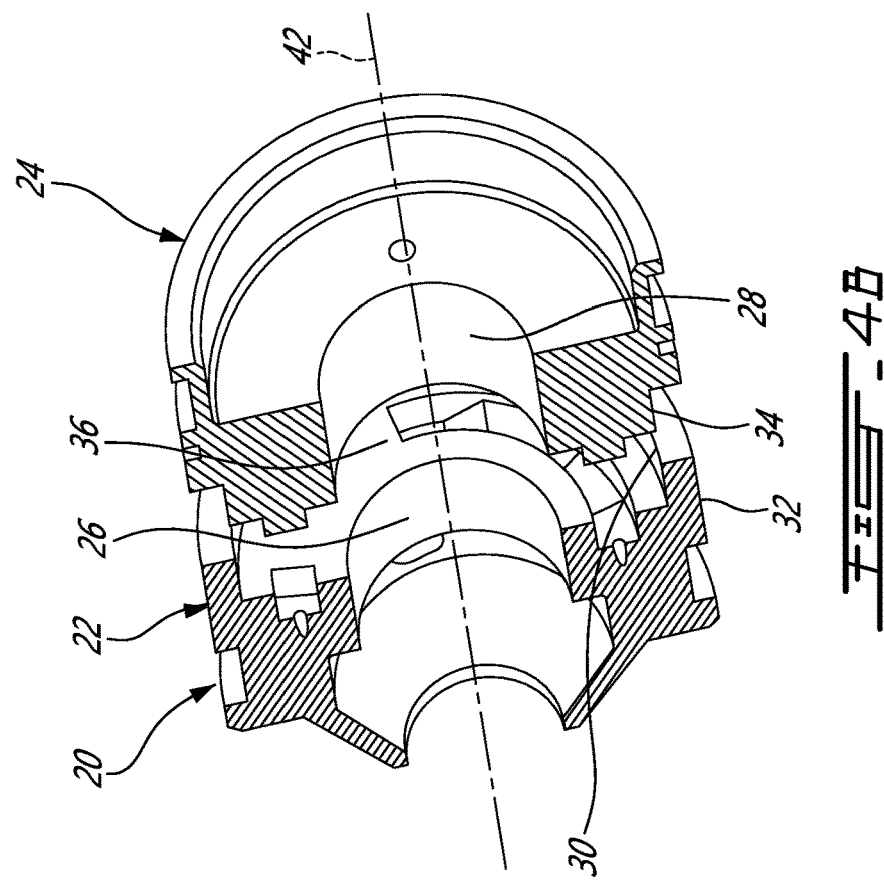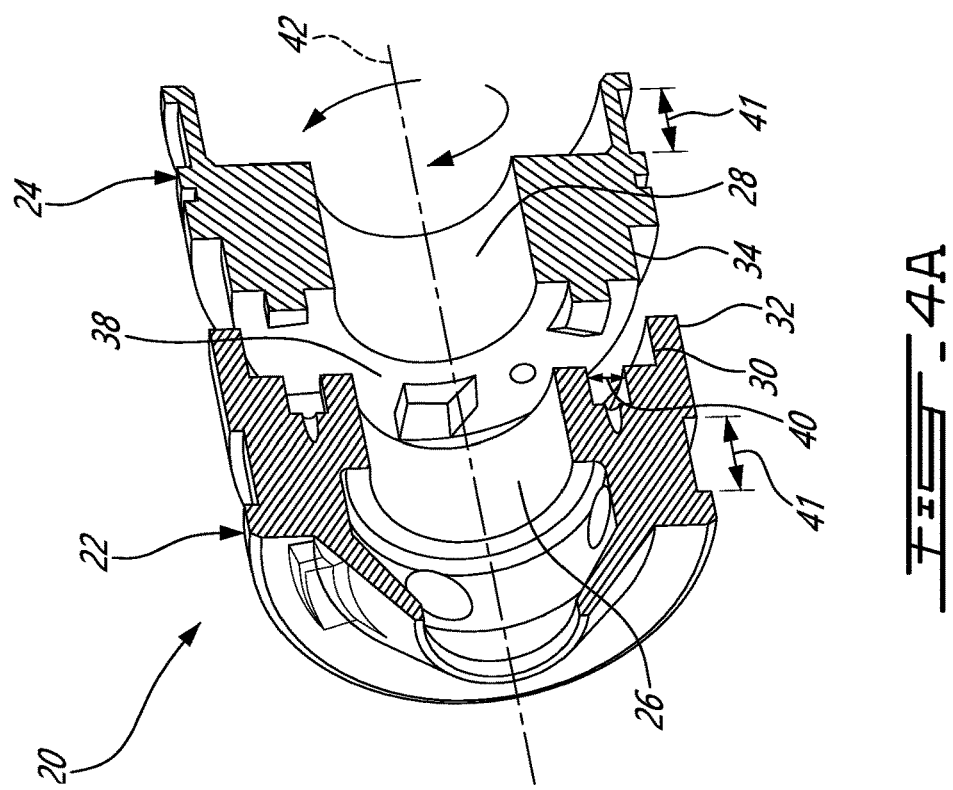
FIG-4A
FIG-4B

GCODE FILE EXAMPLE

```
(. . .)
N250 T9000 ; RMP1200 Straight
(. . .)
N280 ; START SUBROUTINE NO: 900001
N285 CALL "(. . . . Subroutine 900001 . . . .)"
(. . .)
```
— 350

```
N5  ; (************************************************)
N10 ; (***         TURNING SUB NUMBER: 900001       ***)
N15 ; (************************************************)
N20 ;SUB_ID: 900001
(. . .)
N90  G94 Z2.19 F400.
N100 G2 X3.711 Z.100
N110 G1 X3.900
N120 G3 X3.877 Z1.125
(. . .)
N300 G3 X8.8477 Z-.02675
N310 G1 X8.94732 Z-.0311
N320 G1 X8.94732 Z-.0311
(. . .)
N400 RET ; END SUBROUTINE NO: 900001
```
— 354
— 352

FIG. 11

SYSTEM AND METHOD FOR MANUFACTURING A PART

TECHNICAL FIELD

The present disclosure relates to systems and methods for manufacturing a part in general, and more particularly, to systems and methods for manufacturing a part which include a tool module and a monitoring module.

BACKGROUND OF THE ART

The design of complex systems such as gas turbine engines involves the design of many individual parts. At the design stage, designers make design choices, such as evaluating manufacturing options or determining tolerances, based on information made available to them. A number of "as designed" part definitions can then make their way to a production management stage in which production managers can seek to optimize production also based on information made available to them. The production manager tasks can include production planning, and can also include the determination of inspection schedules. Inspection schedules can be defined in a manner to reduce the inspection burden while respecting quality criteria, and information such as inspection results of previously produced identical parts can be useful in achieving these objectives. It will be understood that the more structured information is practically made available, the more the manufacturing process can be improved. For instance, the more structured information is made available to designers or to production managers, the more instrumented they are to extract knowledge out of it and take good decisions. Structured information from manufacturing processes may also be useful in training machine learning engines. Information about manufacturing processes can be relevant for other persons involved in the design, production or sales of parts and systems. While former techniques of collecting, communicating and/or retrieving information were satisfactory to a certain degree, there always remains room for improvement.

SUMMARY

In one aspect, there is provided a system for manufacturing a part, comprising: a tool module selectively controllable to execute a sequence of one or more manufacturing process steps to one or more features of the part; a monitoring module selectively controllable to generate one or more manufacturing data segments, the one or more manufacturing data segments describing an execution of the sequence of the one or more manufacturing process steps; and an associator module in communication with the monitoring module and a non-transitory memory storing instructions, which instructions when executed cause the associator module to construct one or more feature-based manufacturing data items using i) sequence data associated to the one or more manufacturing data segments, the sequence data indicating an order of the one or more manufacturing process steps in the sequence, and ii) an associator table having one or more feature identifiers associated to one or more sequence references, the one or more feature identifiers identifying the one or more features, which instructions when executed further cause the associator module to associate the one or more manufacturing data segments with the one or more feature identifiers based on associating the sequence data to the one or more sequence reference.

In another aspect, there is provided a method of manufacturing a part, the method comprising: performing a sequence of one or more manufacturing process steps to one or more features of the part; generating one or more manufacturing data segments describing the sequence of the one or more manufacturing process steps; and constructing one or more feature-based manufacturing data items using manufacturing data having the one or more manufacturing data segments associated with reference data, the reference data indicating an order of the one or more manufacturing process steps in the sequence, and an associator table having one or more feature identifier of the one or more features associated to one or more sequence references, the constructing including associating the one or more manufacturing data segments with corresponding ones of the one or more feature identifiers based on associating the sequence data to the one or more sequence references.

In a further aspect, there is provided a method of improving a manufacturing process, the method comprising: receiving tool path data including one or more tool paths corresponding to a sequence of one or more manufacturing process steps to be executed to one or more features of a part, the one or more tool paths associated to sequence data, the sequence data indicating an order of the one or more manufacturing process steps in the sequence; receiving tool geometry data including one or more tool geometries associated to the one or more tool paths; receiving feature geometry data including one or more feature geometries of the one or more feature of the part associated to one or more feature identifiers of the one or more features; computing one or more tool locations based on the one or more tool paths and the one or more tool geometries; and constructing an associator table including comparing the one or more tool locations and the one or more feature geometries to identify matches; and associating the one or more feature identifiers to the one or more sequence references based on the matches and the sequence data.

DESCRIPTION OF THE DRAWINGS

Reference is now made to the accompanying figures in which:

FIG. 2 is an oblique view of an example system for manufacturing a part;

FIG. 3A is a schematic view of data flow in the context of manufacturing operations.

FIG. 3B is a schematic view of a first data item format;

FIG. 3C is a schematic view of a second data item format;

FIGS. 4A and 4B are oblique views taken from different angles of a gas turbine engine fuel nozzle assembly including two parts;

FIG. 11 is an example GCode file;

DETAILED DESCRIPTION

Figure 1:
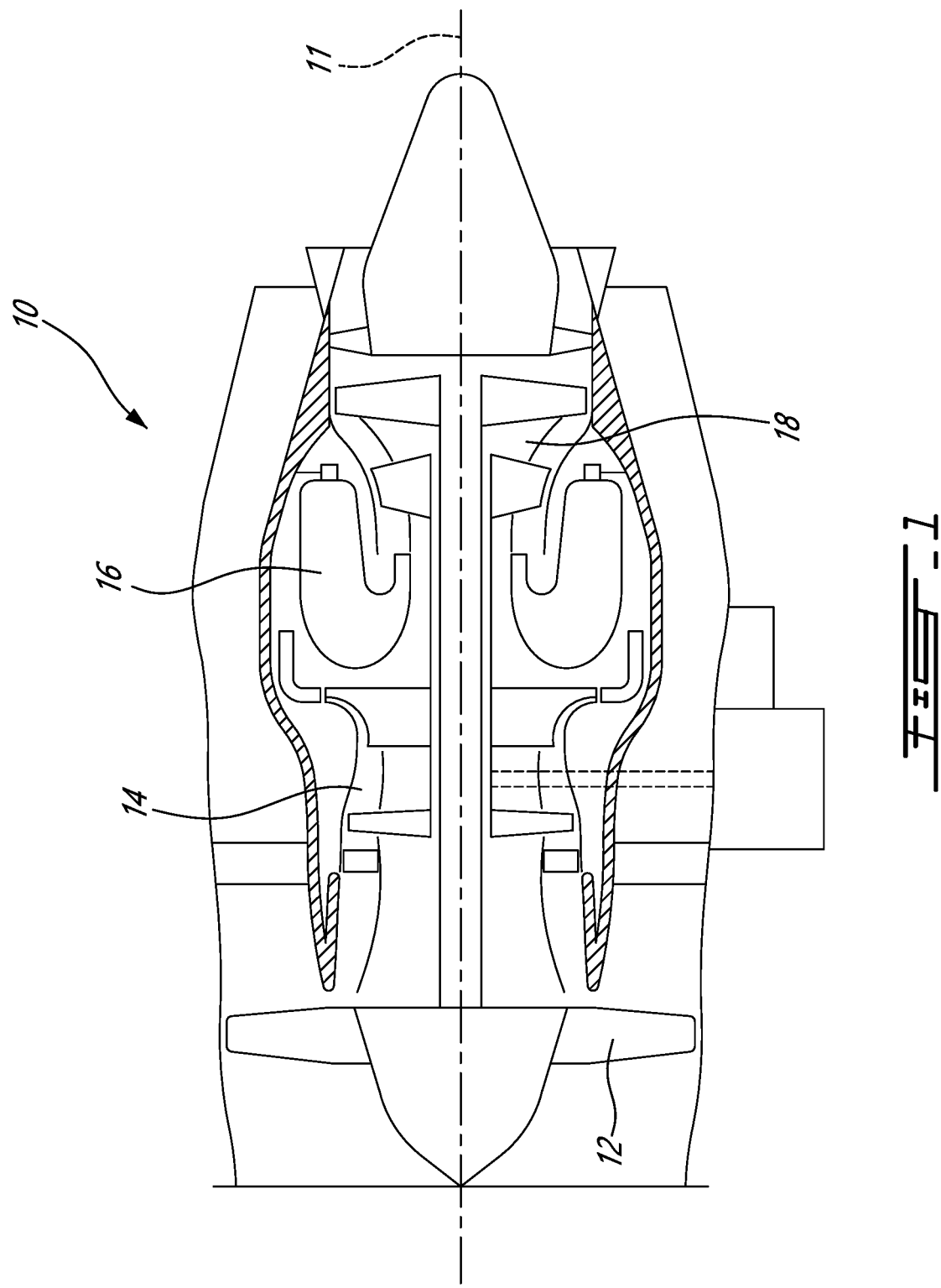
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor section 16 in which the compressed air is mixed with fuel and ignited for generating an annular stream of hot combustion gases around the engine axis 11, and a turbine section 18 for extracting energy from the combustion gases.

A complex system such as a gas turbine engine can have a large number of parts, the manufacture of which can involve a sequence of manufacturing process steps. Manufacturing process steps can be associated to a variety of manufacturing processes such as casting, 3D printing, machining, and inspection, and a sequence can include a plurality of same and/or different processes (e.g. rough machining followed by finishing machining and then inspection, or casting followed by machining). Some, or all of these process steps can be automated with one or more machine such as Computer Numerical Control (CNC) machining, a "3D printer" for additive manufacturing, water jet cutting, and Coordinate-Measuring Machine (CMM) inspection.

FIG. 2, presents an example of a Computer Numerical Control (CNC) machine 44 which may or may not include an on-machine measurement module, for instance.

As presented in FIG. 3A, computers associated with automated manufacturing processes such as Computer Numerical Control (CNC) machining 44 and Coordinate-Measuring Machine (CMM) inspection 46 can be enabled to perform computerized information collection leading to manufacturing data 50 which can be stored in a database 48.

As represented in FIG. 3B, a manufacturing data segment 50 can be included as part of a data item 52 together with a identifier 54 of the part (PartID), in two corresponding fields of the data item 52. By including the partID 54 with the manufacturing data segment 50 in the data item 52, a query can be performed using the partID 54 in a manner to allow a user, such as a designer, production manager or software application (e.g. machine learning engine), to retrieve information pertaining to the manufacturing of the part. Such a user may wish to access inspection data, for instance, to ascertain the degree at which targeted design tolerances are met in practice for the given part, or go even further and access data associated to a machining process. While organizing manufacturing data in this manner can be satisfactory to a certain degree, it will be understood that the user wishing to access the inspection data specific to a certain feature of the part will need first to access the data for the part, and then find the data associated to the feature he is targeting amongst the other manufacturing data 50 associated to the part 22, which can be burdensome. Moreover, there may have been a limited number of that part 22 which has been actually manufactured, which may limit the amount of information available, and lead to correspondingly limited level of statistical representation for instance.

Let us take an example to better illustrate what is meant by the above. FIGS. 4A and 4B presents an example gas turbine engine assembly 20 which includes two parts 22, 24. In this example, the assembly is a fuel nozzle assembly 20 which is designed in a manner to be formed by the relatively close fitting of a first fuel nozzle part 22 and of a second fuel nozzle part 24. A plurality of such fuel nozzle assemblies 20 can ultimately be used in a circumferentially distributed manner in the combustor section 16 of a gas turbine engine. Innumerable alternate examples of parts can exist and this specific example is used here arbitrarily, simply to assist in giving a clear explanation of concepts involved in this disclosure. In this specific example, these two parts 22, 24 can be designed for machining from a cylindrical bar of titanium or aluminum using one or two subsequent CNC machining stations for instance. Such parts 22, 24 can each have a plurality of features such as curved surfaces having internal diameters 26, 28, 30 or outer diameters 32, 34, planar surfaces 36, 38, gaps 40 between planar surfaces, gaps 41 between curved surfaces, etc. Such features can be defined by characteristics. For instance, an internal diameter 26, 28, 30 can be defined by an axis 4 position and orientation, a nominal diameter and tolerances, and a planar surface 36, 38 can be defined by a position and orientation, a perimeter, and tolerances. Such features, including characteristics, can be defined by designers at the design stage. Some features can have tighter tolerances which may require a stricter inspection schedule than others. In some embodiments, it can be advantageous for the designer to define characteristics of a feature independently from the characteristics of all other parts, whereas in other embodiments, it can be advantageous for the designer to define characteristics of a feature of a part relatively to characteristics of a feature of another part with which it is configured to be assembled to. It will be noted here for example that, an internal diameter feature 30 of the first part 22 is configured to receive an external diameter feature 34 of the second part 24, and the two are thus related to one another, as mating male and female members, for instance. Other examples of parts which can benefit from the description below can include turbine disks, spline engagements, integrated bladed rotors (IBRs), etc.

Occurrences of performing a manufacturing process step on a given feature can be significantly more common than occurrences performing a manufacturing process step a given part 22. Indeed, a same feature can be integrated to a large number of different parts 22, 24. For a feature realized by a same manufacturing process step, or a same sequence of manufacturing process steps, the manufacturing data may be equivalently relevant to a given intended use, independently of which part 22, 24 the feature is embodied in. However, using a manufacturing data storing process in which manufacturing data segment 50 is associated to corresponding PartIDs 54 may not allow a user to suitably, easily, retrieve relevant data about a given feature as it may exist in relation with other PartIDs, as the user may be limited to performing queries based on a pre-identified PartIDs.

In some embodiments, such inconveniences can be addressed by a different manufacturing data storage data item format, an example of which is presented in FIG. 3C, and in which manufacturing data segment 50 is stored not as a function of the PartID 54 of the part to which it pertains, but as a function of an identifier of a feature (FID) 58 to which it pertains.

Figure 5:
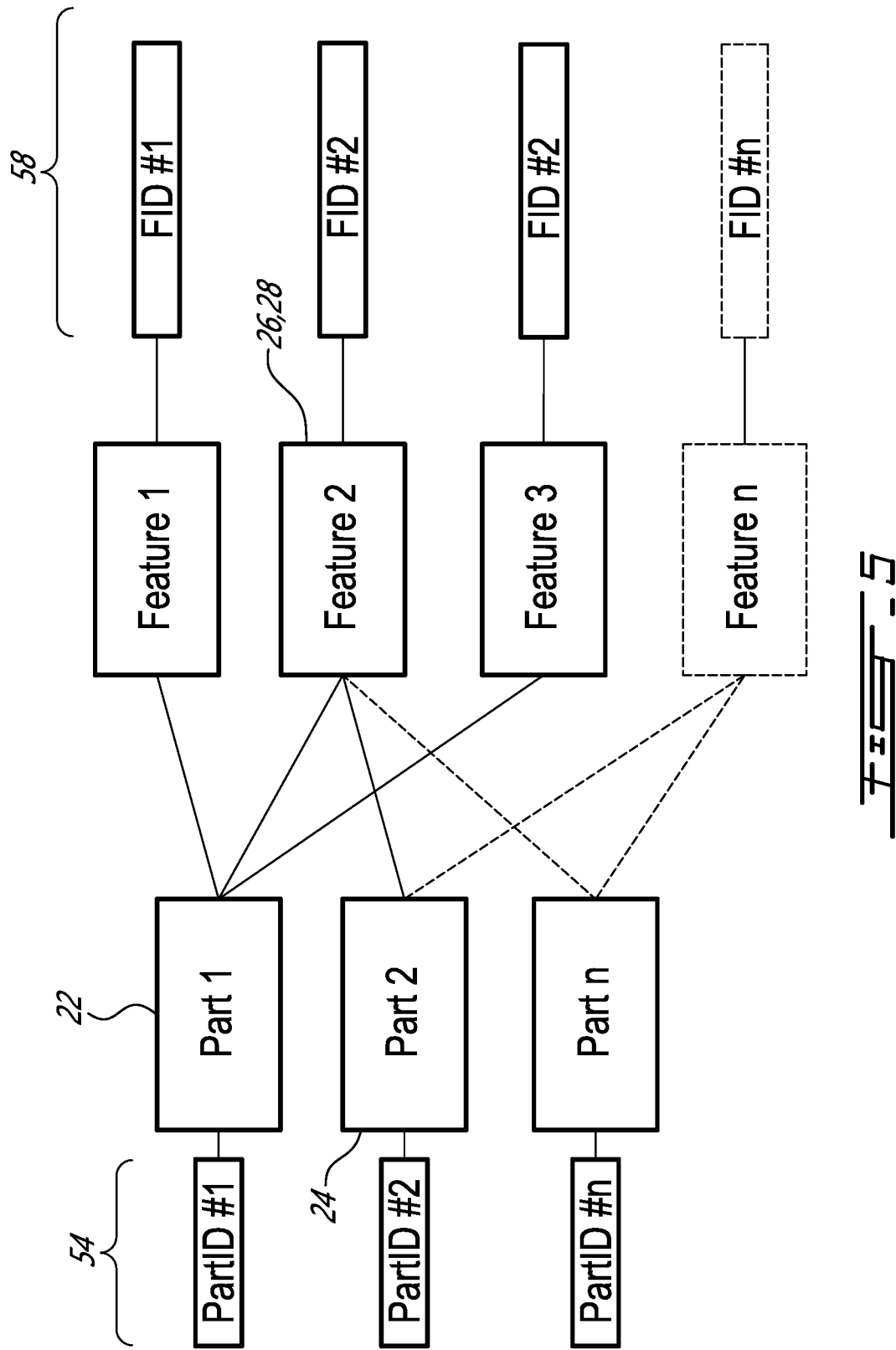
FIG. 5 is a schematic representation of the relationships between parts and features, and corresponding identifiers.

Let us turn to FIG. 5 to explain and define the relevant notions. As seen in this example, a plurality of parts can each have a corresponding combination of features. The features can be unique to a single part, or common to two or more of the parts. In this example, for instance, both Part 1 (e.g. part 22) and Part 2 (e.g. part 24) have Feature 2 (e.g. 26, 28). By contradistinction with associating the manufacturing data to identifiers (PartID #s) 54 of corresponding ones of the parts, which allows uniquely identifying a given part and distinguishing it from the other parts, feature identifiers (FID #s) 58 are defined here in association with corresponding features, which allow uniquely identifying a given feature and distinguishing it from the other features.

Features can be tied to a geometrical features of one or more surface of one or more part. While the full characteristics of the relevant geometrical features may be used as a feature identifier, such a scheme will typically be impractical in many embodiments since it can often be possible to devise a feature identifier which achieves the function of fully and uniquely identifying the feature, while using significant less data than the full characteristics of the relevant geometrical features. Accordingly, the feature identifier can be a code used to uniquely identify a given feature, which can be used to distinguish the feature from all other tracked features, while not inherently carrying data associated to the full geometrical definition of the feature.

Feature identifiers (FIDs) 58 can be defined in accordance with a standard to allow different users to use a common "language" to refer to corresponding ones of a plurality of features. The standard used to define the feature identifiers can vary from one embodiment to another. In one embodiment, for instance, it may be decided to use the UUID format, in the context of the Quality Information Framework (QIF), as feature identifiers for corresponding feature definitions. In other embodiments, other standards can be used instead, while still allowing to group corresponding features independently of the part in which they are included. More than one feature identifier type, or more than one feature identifier format may be used in association with a given manufacturing process. For instance, a first feature identifier may be associated to a given feature by a manufacturing machine, in accordance with a first format, and once communicated to a database, the data item may be processed to include an additional identifier for one or more of the given feature, or to replace the first feature identifier with a second feature identifier having a different format.

Figure 6:
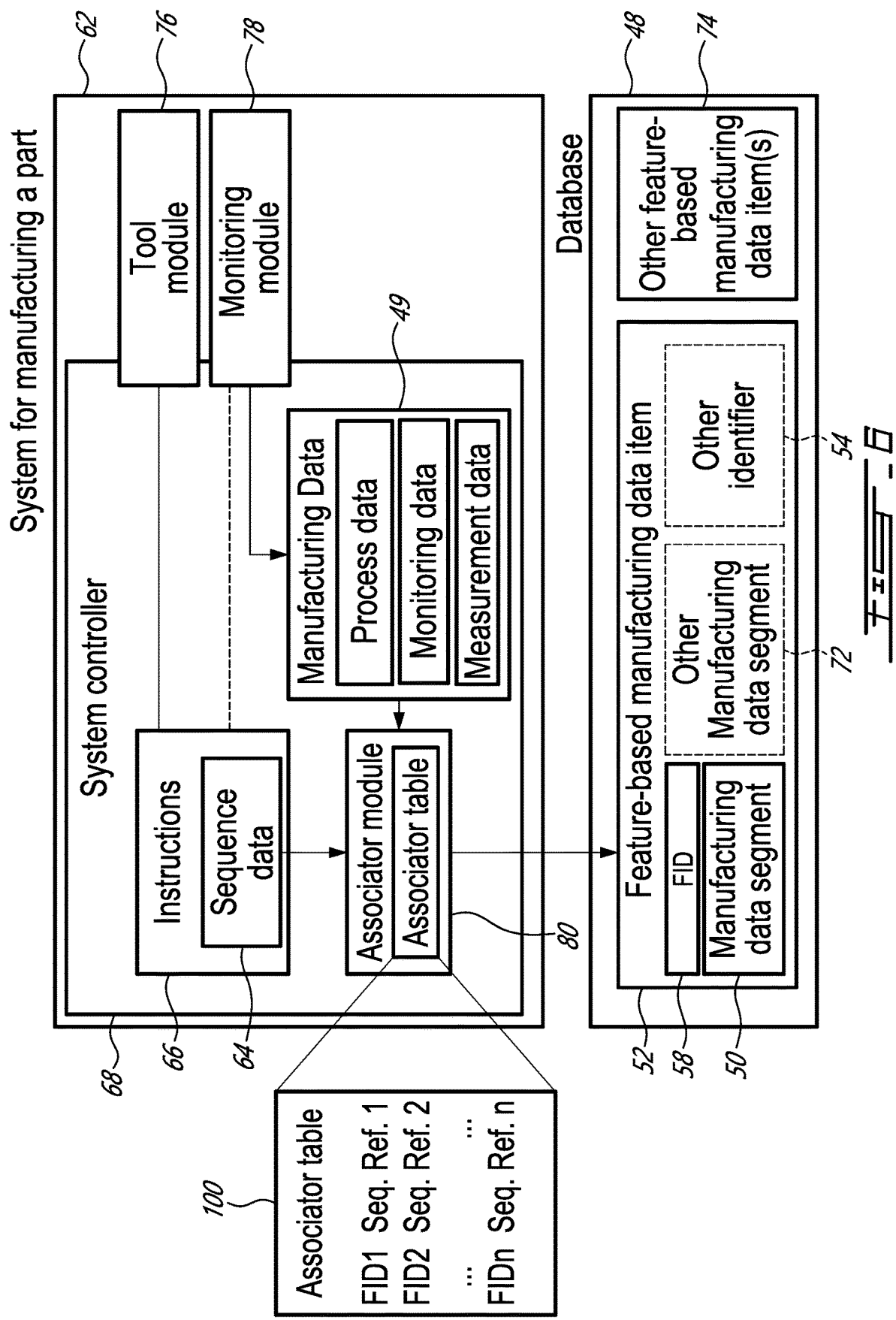
FIG. 6 is a block diagram of a manufacturing machine, in accordance with an embodiment.

FIG. 6, represents a system for manufacturing a part 62 such as CAM/CNC machining machine 44 or CMM (DCC) inspection machine 46. Such systems can have a tool module 76 selectively controllable (e.g. by system controller) to perform a sequence of one or more manufacturing process step to one or more features of the part. Such a sequence of, typically more than one, manufacturing process steps can be automated via the system controller, which can be configured to control the tool module 76 on the basis of instructions 66 which are stored in a memory. The memory can be non-volatile, the memory can be non-transitory. In other words, the memory can be not a signal memory, but a memory where data such as instructions can be stored for a processor to access and execute upon. The instructions 66 can be G-code, for instance, in an embodiment where the system for manufacturing the part 62 is a CNC machining machine. Different process steps can be associated to different commands in the instructions 66, for instance.

Independently of the exact details, which will vary from one embodiment to another, the instructions 66 can be in the form of software code which can include information about the order in which the one or more manufacturing process steps are to be executed in the sequence. This information will be referred to as a "sequence data" 64 herein. Depending on the embodiment, the sequence data 64 can take different forms. For instance, the sequence reference 64 can be embodied as a line number associated to different lines of codes of the instructions. In another example, the sequence reference 64 can be a temporal reference and include realtime or relative time information, either directly, or inherently, such as being derivable by a tool path and a tool displacement speed. In another example, the sequence data 64 can be a distance along an interpolation, machine coordinates, or other location-based markers (by contrast with time-based markers). For instance, a given line of code can specify a tool displacement speed and a tool displacement path, in which case the sequence data 64 can include a given period of time, corresponding to the time it takes for the tool to travel along the tool displacement path at the tool displacement speed, in a given line of code.

The system for manufacturing a part 62 may further have a monitoring module 78 used to generate manufacturing data 49 which defines (e.g. characterizes), the execution of the sequence of the one or more manufacturing process steps defined in the instructions 66. For instance, in an embodiment where the system for manufacturing a part 62 is a CNC machining machine 44, the monitoring module 78 may include sensors used to monitor various process parameters, such as force applied on tool during machining, lubricant flow, etc, or to measure the results of a previous machining operation with an on-machine measurement module. The manufacturing data 49 can be said to include a number of different manufacturing data segments 50 in which different segments may pertain to different moments in time of the execution of the sequence of manufacturing process steps, and/or different positions of the tool along a tool displacement path. Different manufacturing data segments 50 may pertain to different manufacturing process steps for instance, and to execution of the manufacturing process steps on different ones of the features of a given part.

Manufacturing data 50 can be provided in various forms, the details of which can vary as a function of the embodiment. In one embodiment, manufacturing data can include measurement data. Measurement data can be collected by a tool monitoring subsystem of a CMM machine 46, for instance, or, in certain embodiments, by a tool monitoring subsystem included as part of a CNC machine 44 which is provided with some measurement capabilities. In such cases, the tool can be a probe. The measurement data can be collected by the system for manufacturing a part 62 while performing the corresponding process step (e.g. a measurement step associated to the feature).

In an embodiment, manufacturing data 50 can include monitoring data. Indeed, a CNC machine 44, for instance, may be configured to collect measurements associated to a corresponding cutting process step. Such measurements can include one or more values of cutting/spindle load, coolant flow, temperature (e.g. spindle temperature), vibrations (e.g. amplitude and frequency spectrum). Indeed, if a user of feature-based manufacturing data items 52, 74 sees something unusual or particular about measurement data, he/she may wish to look into monitoring data in greater detail, for instance. The monitoring data can be collected by the manufacturing machine 62 while performing the process step (e.g. a cutting step such as a rough or finishing cutting step associated to the feature). Different one of the manufacturing data segments may be attributed to different steps on a same feature, a same step on different features, or different steps on different features for instance.

In an embodiment, manufacturing data 50 can include process data. Process data can include internal data to the controller 68 for instance, such as offset values (e.g. internally applied correction following measurement or calibration), measurement or cutting time or duration values, etc. Indeed, if a user of feature-based manufacturing data items sees something unusual or particular about measurement data, he/she may wish to look into monitoring data in greater detail, for instance. The process data can be defined by the controller, while performing the process step, or have been defined prior to the performing of the process step.

In an embodiment, manufacturing data 50 can be collected by one or more machines 62 performing one or more process steps associated to various occurrences of a given feature (e.g. 26, 28) on a plurality of parts (e.g. 22, 24) or on a plurality of occurrences of a given part, and be stored in a corresponding plurality of feature-based manufacturing data items 52, 74 in the database. Indeed, after performing a manufacturing process step on a first occurrence of a feature of a first part, leading to a first feature-based manufacturing data item 52 associated to a first occurrence of the feature, the manufacturing process step can be repeated on a second occurrence of the feature on a second part, leading to a second manufacturing data item 74 associated to the second occurrence of the feature in the database 42. Accordingly, if a search (query) is subsequently performed in the database on the basis of a FID 58 associated to the feature, the search can retrieve the first data item 52, the second data item 74, and any additional data item having manufacturing data 50 for the same feature.

In an embodiment, manufacturing data 50 can be collected by more than one machine (e.g. 44, 46) performing corresponding process steps (e.g. machining, measuring) on the same occurrence of a given feature, and the manufacturing data 50, 72 (see FIG. 3C) corresponding to each process step can be included in the same data item in the database. Indeed, after performing a first manufacturing step with a first manufacturing machine (e.g. a rough or finishing cutting step with a CNC machine) and producing an associated feature-based manufacturing data item 52 including first manufacturing data 50, a second manufacturing step with the first manufacturing machine (e.g. finishing cutting step), or with a second manufacturing machine (e.g. measurement with a CMM machine), can lead to second manufacturing data 72, and it can be convenient in some embodiments to insert this second manufacturing data 72 into the first data item 52, rather than creating another data item 74. For instance, the FID 58 can be included in a first field, the first manufacturing data 50 in a second field, and the second manufacturing data 72 in a third field of the data item 52, and so on. In such an embodiment, a search can then be performed by specifying a field identifier (e.g. identifier of the third field) in addition to a FID, and yield the manufacturing data 60 corresponding to the field identifier while not yielding the manufacturing data 50 not associated to that field identifier. In alternate embodiments, it can be preferred to create a new data item 74 with the additional manufacturing data 72. Accordingly, a step of constructing a feature-based manufacturing data item can involve creating a new data item or editing an existing data item, such as by adding a manufacturing data segment to an existing data item already having data pertaining to the corresponding feature identifier 58.

In accordance with the above, an aim may be to construct feature-based manufacturing data items 42 which can be stored in a database and used to improve a manufacturing process. More specifically, an aim can be for the feature-based manufacturing data items to include only relevant manufacturing data segments in association with corresponding ones of a number of feature identifiers (FIDs) 58, e.g. to enable a user or application to subsequently access the manufacturing data segments relevant specifically to that feature via the FID 58 using the database.

A first example way to achieve this aim is to associate FIDs 58 to a definition of corresponding process steps (e.g. commands) in the computer readable instructions 66 (e.g. software code) which are used to control the tool module. Then, knowing which process step is being, or has been performed, and based on the FID 58 associated with a given process step, an associator module 80 can associate manufacturing data 50 describing the execution of a given process step with the FID 58 associated with that process step, into a single feature-based manufacturing data item, which can then be stored in a database 42 for subsequent access.

More specifically, the FID 58 and the manufacturing data 50 can be stored in corresponding fields of a single data item 52 in the database 42, in accordance with a configuration wherein the manufacturing data 50 can later be accessed using the FID 58 in a query. The data item 52, which may be referred to as a feature-based manufacturing data item 52, may or may not include other manufacturing data 72 (e.g. manufacturing data collected for another process step executed by a same or a different machine on the same instance of the feature) and may or may not include another identifier (e.g. a PartID 54). The database 42 can be embodied on computer readable memory which can be part of another computer than the controller 68, and the manufacturing machine 62 can communicate with the database 42 via a telecommunications network such as the Internet for instance. Other feature-based manufacturing data items 74 can be stored in the same database 42, and such other data items 74 can pertain to a plurality of different process steps performed by the same or by different machines, to a plurality of different occurrences of the same features, and to a plurality of different occurrences of a number of other features.

In the example presented in FIG. 6, the software code 66 can be specific to a given part, for instance, and a number of different software codes associated to a corresponding number of parts can be stored in a memory of the controller 68 at a given time, with the software code 66 being changed in accordance with production schedules. The tool module 76 can have its own, lower layer, computer readable instructions which allow it to interpret the software code, select a software code corresponding to a given part, and control the tool subsystem accordingly to the instructions 66, and these computer readable instructions may be more permanent than the software code associated to the part, such as remaining the same until an eventual update is performed. Similarly, the monitoring module 78 may have its own, lower layer, computer readable instructions which allow it to interpret the software code 66 instructing it to perform certain monitoring functions, or to otherwise automatically perform certain monitoring functions when certain conditions are met, for instance. The expression associator module 80 can be used herein to refer to a set of computerized functions responsible for associating the manufacturing data segments 50 with the FIDs 58. The associator module 80 can also include function to store them as feature-based manufacturing data items 52 in the database 42.

While the first example way of achieving the aim, described above, can be suitable and advantageous in some embodiments, it may be considered to have shortcomings in other embodiments.

Figure 7:
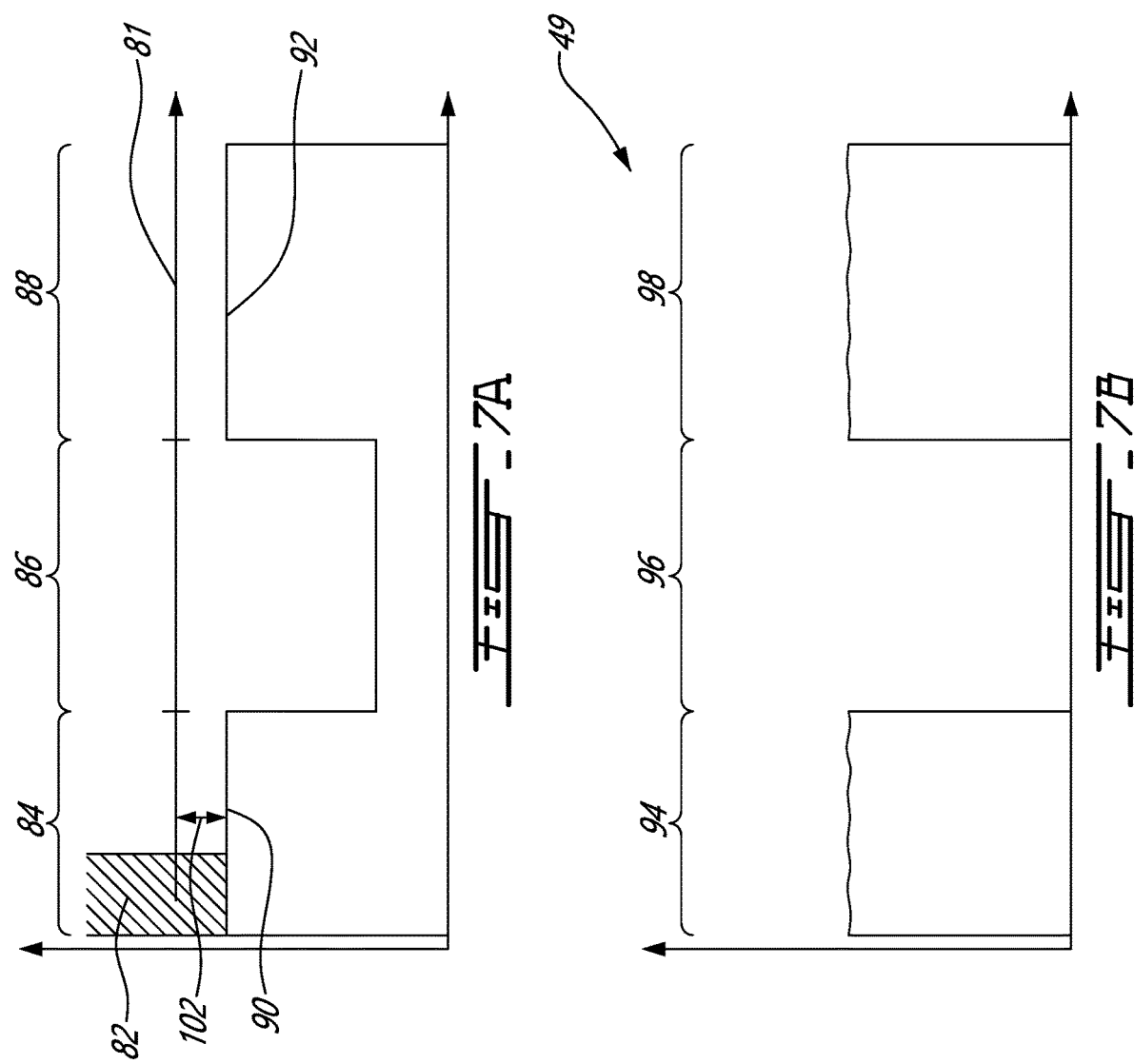
FIG. 7A schematizes the execution of an example manufacturing process step including tool displacement over time.
FIG. 7B schematizes an example of manufacturing data which can be temporally associated to the manufacturing process step of FIG. 7A.

To illustrate this, let us take the example schematized in FIG. 7A, which illustrates the execution of a single command (e.g. line of code or group of lines of code) in the software instructions 66. The command may specify a tool displacement path 81, a tool displacement speed, and a tool 82 (tool identifier) for instance. In some cases, the tool displacement path 81 may continuously follow a surface of the part corresponding to a single feature (which it may or may not modify depending on whether machining or measuring is performed) during the execution of the entire command, in which case, the entirety of the manufacturing data segment collected during the associated command may be relevant to the feature. However, in the example schematized in FIG. 7A, this is not the case. A first portion 84 of the tool displacement path 81 continuously follows a first surface of the part corresponding to a first feature 90, a third portion 88 of the tool displacement path 81 continuously follows a surface of the part corresponding to a second feature 92, and a second portion of the tool displacement path 86 may correspond to free displacement between the two features 90, 92, and not be associated to a defined feature.

To follow up on this example, FIG. 7B presents an example of manufacturing data 49 which may be collected during the execution of this single command. In this specific example, the manufacturing data 49 can include a measurement of force at the tool (y-axis) during the execution of the single command, which may include three subsequent segments 94, 96, 98 of time-varying force values, including a first segment 94 when the tool is in contact with the surface associated to the first feature 90, a second segment 96 when the tool is not in contact with the part (in free displacement), and a third segment 98 when the tool 82 is in contact with the surface associated to the second feature 92. In this example, it will be understood that only the first segment 94 of manufacturing data 49 is relevant to the first feature 90, and only the third segment 98 of manufacturing data 49 is relevant to the second feature 92, notwithstanding the fact that all three segments of manufacturing data are associated to a given process step.

In an embodiment where the execution of the entire command is associated to, say, the first FID, the associator module 80 may not be enabled to partition the first segment 94 of manufacturing from the second 96 and third 98 segments of manufacturing data 49, and a potential result may be that all three segments of manufacturing data 49 may be included in the manufacturing data item 52 pertaining to the first feature 90. This can be undesired in some embodiments, as it can make it more difficult for a user or an application such as a machine learning engine to extract the relevant segment of manufacturing data 49 from the manufacturing data stored in relation with a given feature ID.

A second example way of achieving the aim may allow to alleviate or overcome such inconveniences. In this second example way, an associator table 100 is built upstream of, or during, the execution of the manufacturing process. The associator table 100 has the feature identifiers (FID1, FID2, . . . , FIDn) associated to corresponding ones of sequence references (seq. ref. 1, seq. ref. 2, . . . , seq. ref. n), the latter being indicative of an order of the one or more manufacturing process steps in the sequence. There are different ways in which the sequence references can be embodied in a manner to be used to determine an order of the one or more manufacturing process steps in the sequence, and the nature of the sequence references can be tied to the nature of the sequence data. A first way the sequence references can be embodied is for the sequence references to be ranges of time values. In this case, the sequence data can be associated to real-time indicators of the execution of the sequence of manufacturing process steps related to the instructions. Accordingly, one can find a match between the real-time indicators in the sequence data and the ranges of time values specified in the sequence references. For instance, referring to FIG. 7A, the first segment of manufacturing data 94 can be encoded with sequence data as having occurred within a first range of time values, say 1120 ms and 1310 ms, corresponding to a first sequence reference, and the third segment of manufacturing data 98 can be encoded as having occurred within a third range of time values, say 1520 and 1670, corresponding to a second sequence reference. A second way the sequence references can be embodied is for the sequence references to be line numbers of the instructions, such as G-Code lines for instance. A third way the sequence references can be embodied is for the sequence references to be in the form of a range of locations along a tool path. For instance, referring to FIG. 7A, the first segment of manufacturing data 94 can be encoded with sequence data as having occurred during the range of locations 84 of the tool displacement path, say x1=120.0 mm and x2=160.0 mm, corresponding to a first sequence reference, and the third segment of manufacturing data 98 can be encoded as having occurred within a third range of tool location values, say x1=230.0 mm and x2=270.0 mm, corresponding to a second sequence reference. In some embodiments, rather than being present in the manufacturing data 49, the sequence data 64 can be acquired, by the system controller 68, via the instructions 66 themselves, and therefore, the system controller 68 can be configured to produce manufacturing data 49 in which the different data segments are associated to corresponding sequence references.

Figure 8:
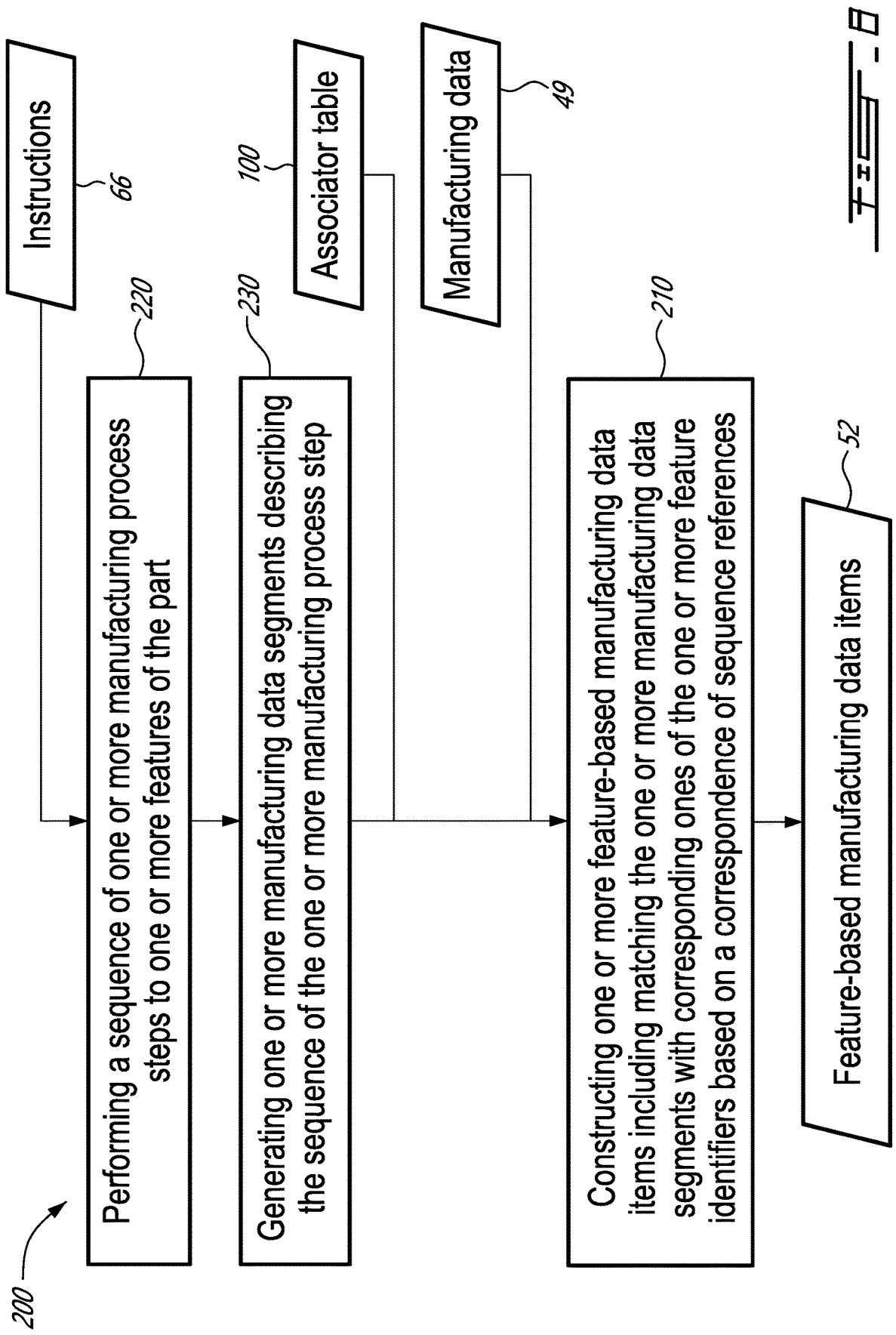
FIG. 8 is a flow chart of an example method of constructing one or more feature-based manufacturing data items.

Then, in a process schematized at FIG. 8, the associator module 80 can construct 200 the feature-based manufacturing data items by associating 210 FIDs defined in the associator table 100 with manufacturing data segments of the manufacturing data 49 based on an association between the sequence data and the sequence references (seq. ref. 1, seq. ref. 2, . . . , seq. ref. n) also present in the associator table 100. In some embodiments, a corresponding segment of the sequence data and/or the corresponding sequence reference may be preserved in the feature-based manufacturing data items 52 so constructed, whereas in other embodiments they may then be discarded. Once the construction 200 of the data items 52 has been completed, the manufacturing data segments which have not been associated to any feature identifier may be deleted or stored elsewhere.

It will be understood that the step of constructing the feature-based manufacturing data items can be performed following a step of performing 220 a sequence of one or more manufacturing process step to one or more feature of the part, and generating 230 one or more manufacturing data segments describing the sequence of the one or more manufacturing process steps.

Such a second example way of achieving the aim may enable more granularity in terms of associating feature IDs 58 to manufacturing data segments 50. For instance, if the sequence data 64 is temporal, the associator table 100 may define distinct sequence references (e.g. seq. ref. 1, seq. ref. 2, . . . , seq. ref. n) for different ones of the three tool path segments 84, 86, 88 of FIG. 7A. Then, for instance, the distinct sequence references may be used to distinguish and associated different ones of the three corresponding manufacturing data segments 94, 96, 98 of FIG. 7B. In such an example, the associator module 80 may associate only the first manufacturing data segment 94 to the first feature ID (e.g. FID1), in a first feature-based manufacturing data item 52, rather than additionally including an irrelevant segment 96 associated to a free displacement of the tool, or an irrelevant segment 98 associated to another FID. The associator module 80 may also associate only the third manufacturing data segment 98 with the second feature ID (e.g. FID2) in a second feature-based manufacturing data item 74. Accordingly, two feature-based manufacturing data items may be produced, with respective FIDs, for a single command, tool displacement, or line of code. The associator module may ignore or delete the segment 96 which is not associated to any one of the feature identifier.

Figure 9:
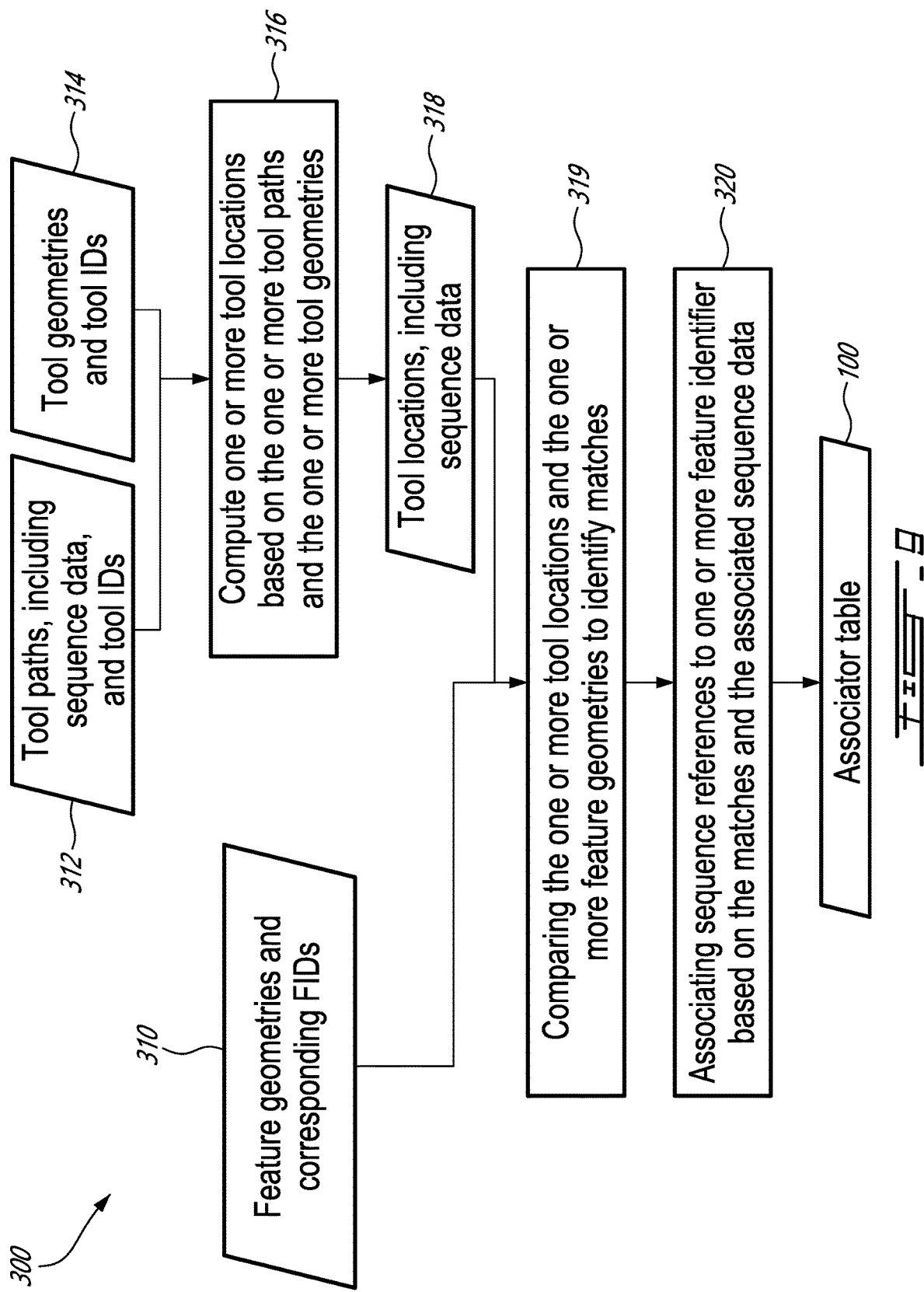
FIG. 9 is a flow chart of an example method of constructing an associator table.

FIG. 9 presents an example of a process to construct 300 an associator table 100. The process 300 can be automated, and be computer-implemented. In this example, a number of inputs are provided.

One of the inputs 310 includes geometries of the different ones of the features in association with an identifier of the different ones of the features. One potential source for such an input 310 is the CAD model of the part itself, which may include identifiers of the different surfaces of the part together with a definition of the detailed geometries of each one of these surfaces.

Another one of the inputs 312 includes tool paths of the different ones of the manufacturing process steps in association with sequence references for corresponding ones of the tool paths. The input 312 may also include identifiers of the tools associated to each one of the tool paths. One potential source for such an input 312 is the software instructions (e.g. the G-Code, or .apt-CATIA™, any other suitable NC instructions) executable to control the tool module to perform the sequence of manufacturing process steps to the features of the part.

Another one of the inputs 314 can include the tool geometries associated to the different tool identifiers.

The process 300 can include more than one function. A first function 316 can use tool paths which can be extracted from the second input 312 for instance, and the tool geometries 314, to compute tool locations 318. Indeed, the part geometry following execution of a manufacturing process step can often correspond to a portion of the tool path 81 offset by a variable 102 (see FIG. 7A) associated to the tool geometry (e.g. an offset between a working surface of the tool and the tool path) for instance, and while the tool geometry is not necessarily defined in the software instructions, a tool identifier may be provided in association with different process steps in the code, and the tool geometry may be retrieved using the tool identifier. It will be understood that in some embodiments, rather than including a function which extracts tool paths from software instructions, the tool paths may be provided directly as an input.

A second function 319 can make comparisons between the tool locations 318 computed from the first function 316, and the feature geometries 310 associated to different FIDs in the first input 310. There are different ways of performing the function 319. In a first example, a tool location surface may be constructed based on the tool path and an offset based on the geometry of the tool, and the tool location surface may be compared to feature geometries. In a second example, a tool location (tool working surface position) may be determined for different positions of the tools along the tool path based on the sequence data, and each tool location can be compared with feature geometries, in a manner to determine whether the tool is "touching" one of the feature geometries at any point along the tool displacement path. The sequence data associated to the tool locations corresponding to a feature geometry can then be used as a basis for defining sequence references.

A third function 320 can then be to associate sequence references to the one or more feature identifiers based on the matches made during the comparison step and the associated sequence data.

The associator table 100 can then be constructed in a manner to list these FIDs in association with sequence references. One way to achieve this is to generate sequence references based on the sequence data, which may be present in the software instructions or second input 312, and carried over throughout the following functions 316, 319, 320. For instance, the tool locations 318 outputted from the first function 316 can be encoded with corresponding sequence data 64 (e.g. process time reference), in which case the sequence reference(s) associated to a given potential geometry may be associated to a FID when a match is established between the given tool locations and a corresponding feature geometry. Optionally, the associator table 100 may include additional data than just the FIDs and the sequence references, such as partID (which may be follow from CAD model), tool geometry (which may follow through first function), tool path (which may follow through first function), and/or any other suitable additional data deemed relevant at the time.

Figure 10:
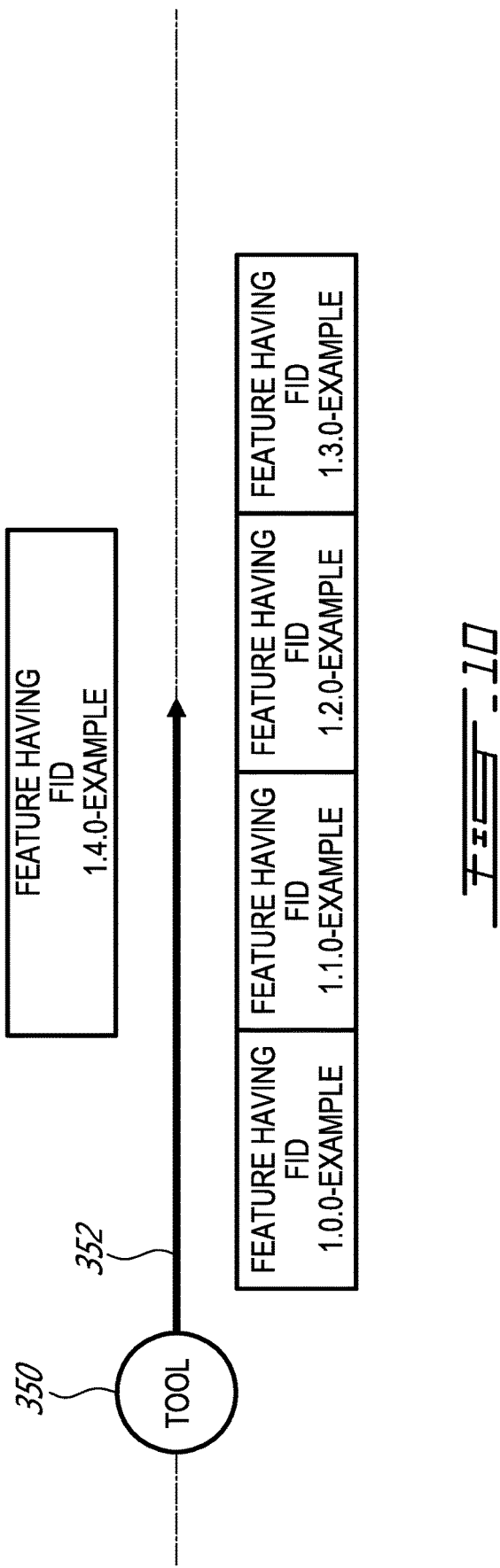
FIG. 10 is a diagram showing an example tool path.

Turning to FIG. 10, let us now turn to a detailed example for increased clarity on one potential way of embodying the process. In this example, a sequence of manufacturing process steps involves moving a tool 350 having a given tool geometry along a given tool path 352. The tool path may be set by specifying start location, end location, and movement speed, for instance. As it is displaced along this tool path, the tool can be designed to perform process steps on a number of features, including a first feature having feature identifier (FID) 1.0.0-EXAMPLE, a second feature having FID 1.1.0-EXAMPLE, a third feature having 1.2.0-EXAMPLE, and a fifth feature having FID 1.4.0-EXAMPLE. A fourth feature may be present and be unaffected by this tool displacement. The tool displacement and tool geometry can be embodied in one or more corresponding lines of G-Code for instance.

More specifically, as shown in FIG. 11, a GCode file example is provided. A tool ID 350 encoding the tool geometry can be provided, GCode parameters 354 may be provided, and a tool path 352 may be defined, here in Cartesian coordinates.

Figure 12:
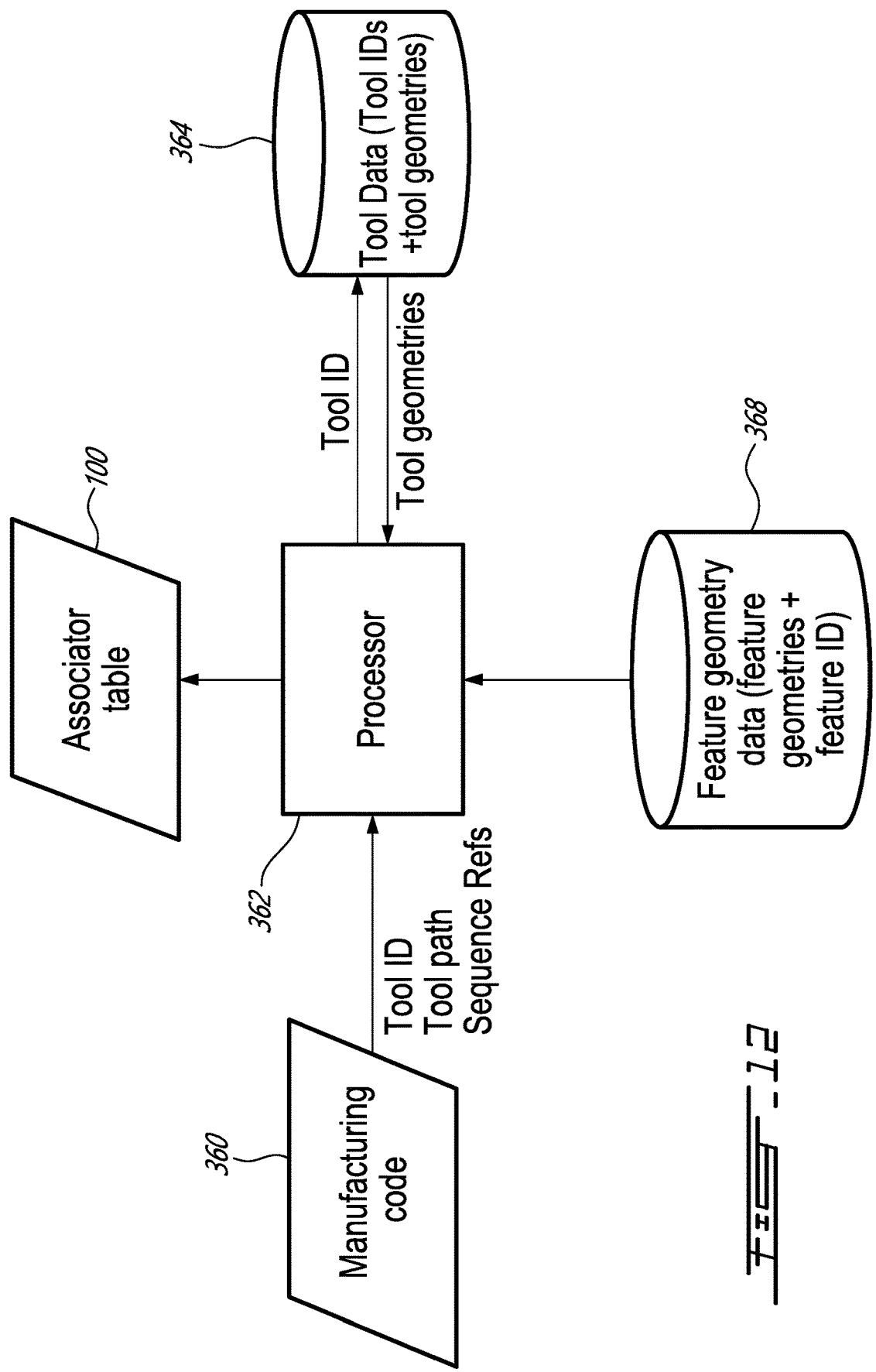
FIG. 12 is a diagram of a process of constructing an associator table.

Turning to FIG. 12, manufacturing code 360, such as the GCode, can be made available to a processor 362 in a manner to allow the processor 362 to retrieve a tool ID 350 and a tool path 352. The tool path 352 may implicitly include sequence references. For instance, a tool displacement speed, or other GCode parameter, may be associated to the geometry of the tool path 352, in which case the position of the tool at any point in time can be computed from these two pieces of data. A data store 364, such as an internal tooling database, having tool geometry data associated to tool IDs can also be made available to the processor 362 for retrieving tool geometry based on tool IDs contained in the GCode, for instance.

Figure 13:
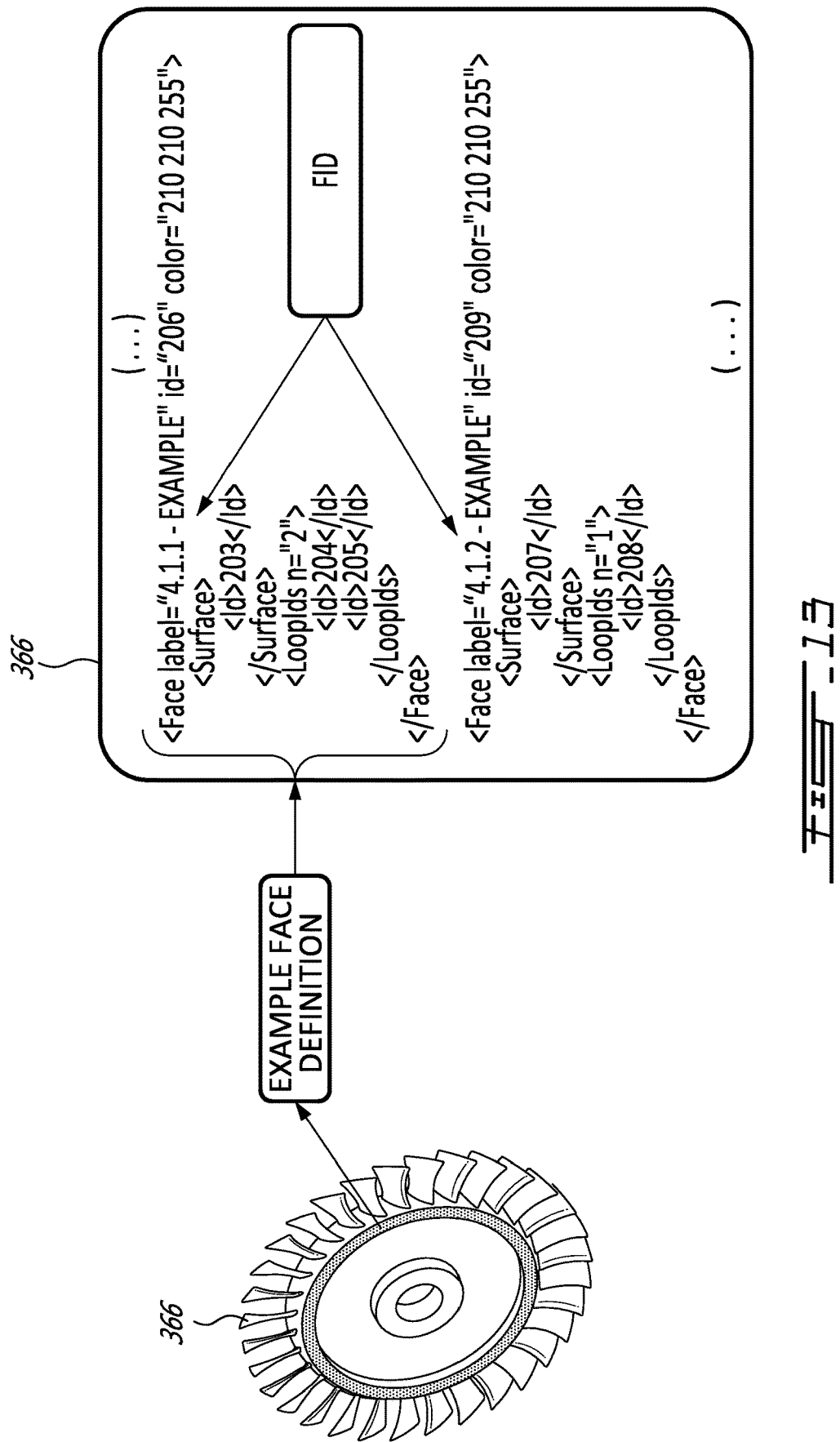
FIG. 13 presents an example of a feature geometry.

Turning to FIG. 13, a 3D model 366 of a part can include not only feature geometry data, but can further include feature identifiers (FID). In one example, a 3D model can be provided in the form of a QIF file as shown. In this example the QIF file includes a number of face definitions, each including a feature identifier in addition to geometrical information of a corresponding face.

Returning to FIG. 12, a data store 368 having feature geometry data (feature geometries associated to feature IDs), such as a 3D model in QIF format, can be made available to the processor 362.

In this specific example, in a first step the processor may build a table. The table can be in the form of a CSV file for instance. An example of data which can be included in the table is presented in the table below:

TABLE 1 table built in example process of association

| N(Line Number) | Program Parameter | X | Y | Z | Tool_ID | Tool Param 1 | Tool Param 2 | Tool Param 3 |
|---|---|---|---|---|---|---|---|---|
| 100 | 400 | 3.711 | 0 | .100 | T9000 | 0.042 | 0 | 0 |
| 110 | 400 | 3.900 | 0 | .100 | T9000 | 0.042 | 0 | 0 |
| 120 | 400 | 3.877 | 0 | 1.125 | T9000 | 0.042 | 0 | 0 |
| 300 | 400 | 1.92308 | 0 | 1.5871 | T9003 | 0.042 | 0 | 0 |
| 310 | 400 | 1.83756 | 0 | 1.616 | T9003 | 0.042 | 0 | 0 |
| 320 | 400 | 1.721 | 0 | 1.616 | T9003 | 0.042 | 0 | 0 |
| 330 | 400 | 1.03543 | 0 | 1.839 | T9003 | 0.042 | 0 | 0 |

In Table 1, the first 6 columns may all be extracted from the GCode and arranged in table format. These may be referred to as GCode data. The 6th line may alternately be referred to as tool data. It will be noted that from the tool paths, line numbers, and program parameters real time information about the position of the tool during the execution of the process steps may be extracted.

The process may also include, within the same table, additional columns including the tool geometries retrieved from the corresponding data store based on the tool IDs contained in the GCode. In this example, these additional columns are included as columns 7-9 and may be referred to as tool data.

The processor can then proceed to perform a process such as illustrated in FIG. 9, and produce a table including the results, such as Table 2 below:

TABLE 2 table built in example process of association

| FID | Enter FID (in) | Enter FID (ms) | Exit FID (in) | Exit FID (ms) | Distance on FID (in) | Duration on FID (ms) |
|---|---|---|---|---|---|---|
| 4.1.1-EXAMPLE | 0.00001 | 0.683296 | 0.008639 | 590.638935 | 0.008629 | 589.955639 |
| 4.1.26-EXAMPLE | 0.1685 | 2736.782729 | 2.126 | 34530.56429 | 1.9575 | 31793.78156 |
| 4.1.2-EXAMPLE | 0.02859 | 1428.654681 | 0.035461 | 1769.440159 | 0.006871 | 340.785478 |
| 4.1.3-EXAMPLE | 0 | 0 | 0.268912 | 42495.81111 | 0.268912 | 42495.81111 |
| 4.1.4-EXAMPLE | 0.13825 | 41.475 | 0.18516 | 55.548 | 0.04691 | 14.073 |
| 4.1.32-EXAMPLE | 0 | 0 | 0.0497 | 1735.255918 | 0.0497 | 1735.255918 |
| 4.1.33-EXAMPLE | 0.565 | 169.5 | 0.56816 | 170.448 | 0.00316 | 0.948 |

Depending on the embodiment, Table 2 can be provided as a standalone table, or as an extension of Table 1 (e.g. additional columns where the original data is preserved).

More specifically, building Table 2 above may include, on the one hand, computing tool locations based on the tool paths and the tool geometries, to obtain a tool locations associated with sequence references. Then, performing a process to associate feature identifiers in the 3D model to the sequence references based on matches between the tool locations and the feature geometries in the 3D model. Then, sequence references may be associated to the FIDs in the resulting associator table.

Indeed, referring back to FIG. 10, the processor 362 may compute the tool contact areas associated to tool locations from time t=0, position (Xo, Yo, Zo), to time t=n, position (Xn, Yn, Zn), where, say, feature having FID 1.0.0-EXAMPLE may be determined to be concerned with one or more process steps between time t=1, position (Xa, Ya, Za) to time t=b, position (Xb, Yb, Zb), feature having FID 1.1.0-EXAMPLE and feature having FID 1.4.0 may both be concerned with one or more process steps between time t=b, position (Xb, Yb, Zb), and time t=c, position (Xc, Yc, Zc), and both features having FID 1.4.0 and 1.2.0 may be concerned by one or more process steps between time t=c, position (Xc, Yc, Zc), and time t=n, position (Xn, Yn, Zn). In such an example, either the tool real time position or the time value may be used as a sequence reference. A data segment determined to be associated to a time between time t=a and time=b, and/or between position (Xa, Ya, Za) and position (Xb, Yb, Zb), may be associated to FID 1.0.0-EXAMPLE, a data segment associated to a time between t=b and t=c, and/or between position (Xb, Yb, Zb) may be associated to both FID 1.1.0-EXAMPLE and FID 1.4.0-EXAMPLE, and so forth. Accordingly, the process may find simultaneously machined FIDs for a single interpolation, find start FID even if the interpolation starts outside the surface associated to the FID, find multiple FIDs for a single interpolation, find end position FIDs, and may reject FIDs not covered by the interpolation.

Figure 14:
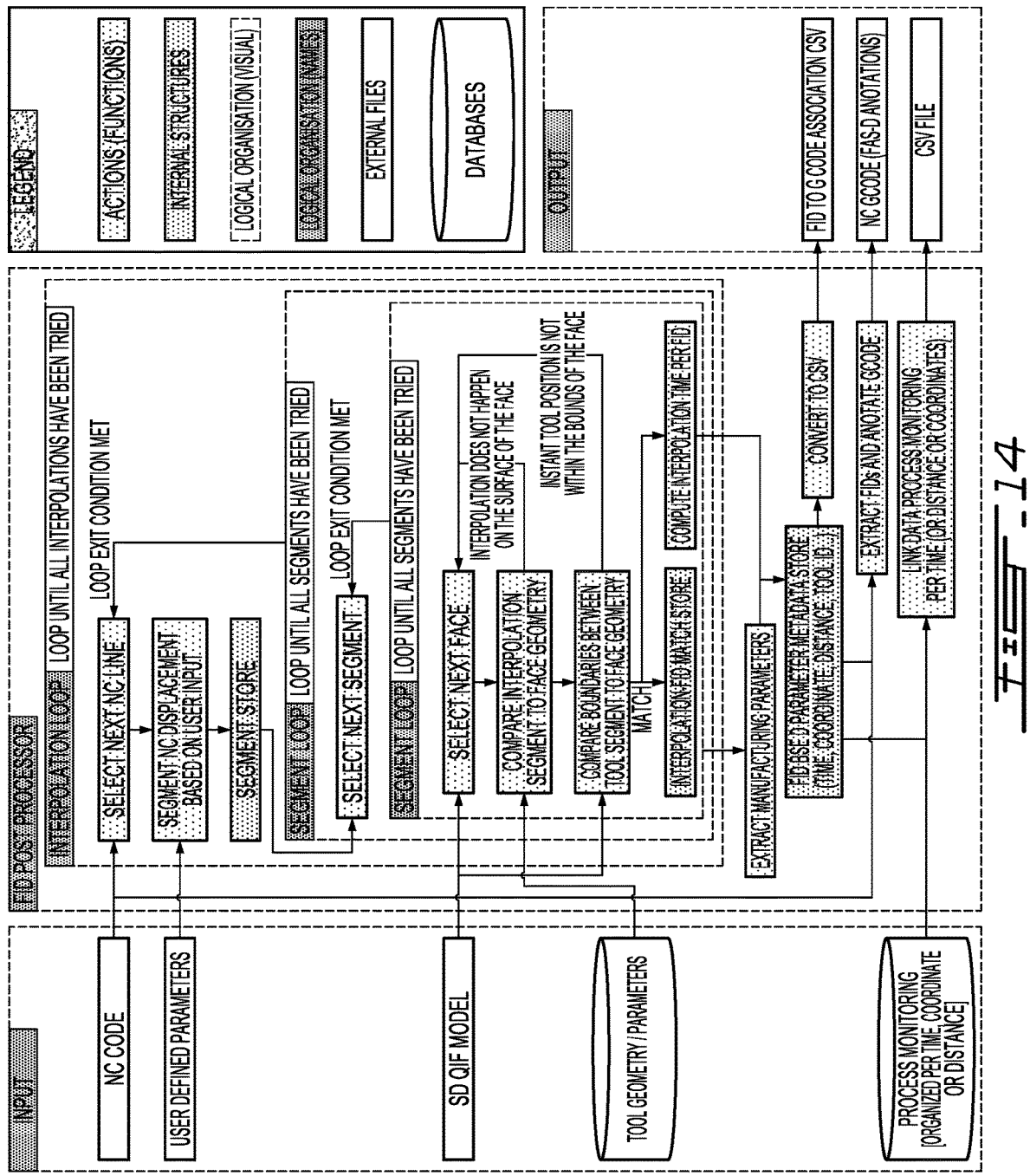
FIG. 14 is a process diagram of an example method of constructing an associator table.

FIG. 14 presents a detailed potential example of a process which can be used to perform the association. The process can involve performing an iterative comparison between each one of the tool locations and the feature geometries. Once a match is found, the process moves onto the next tool location, until all feature identifiers included in the inputs have been matched. In an alternative embodiment, rather than restraining the iterations to features associated to a single part, the iterations can be performed across multiple feature IDs associated to a multitude of different parts.

Figure 15:
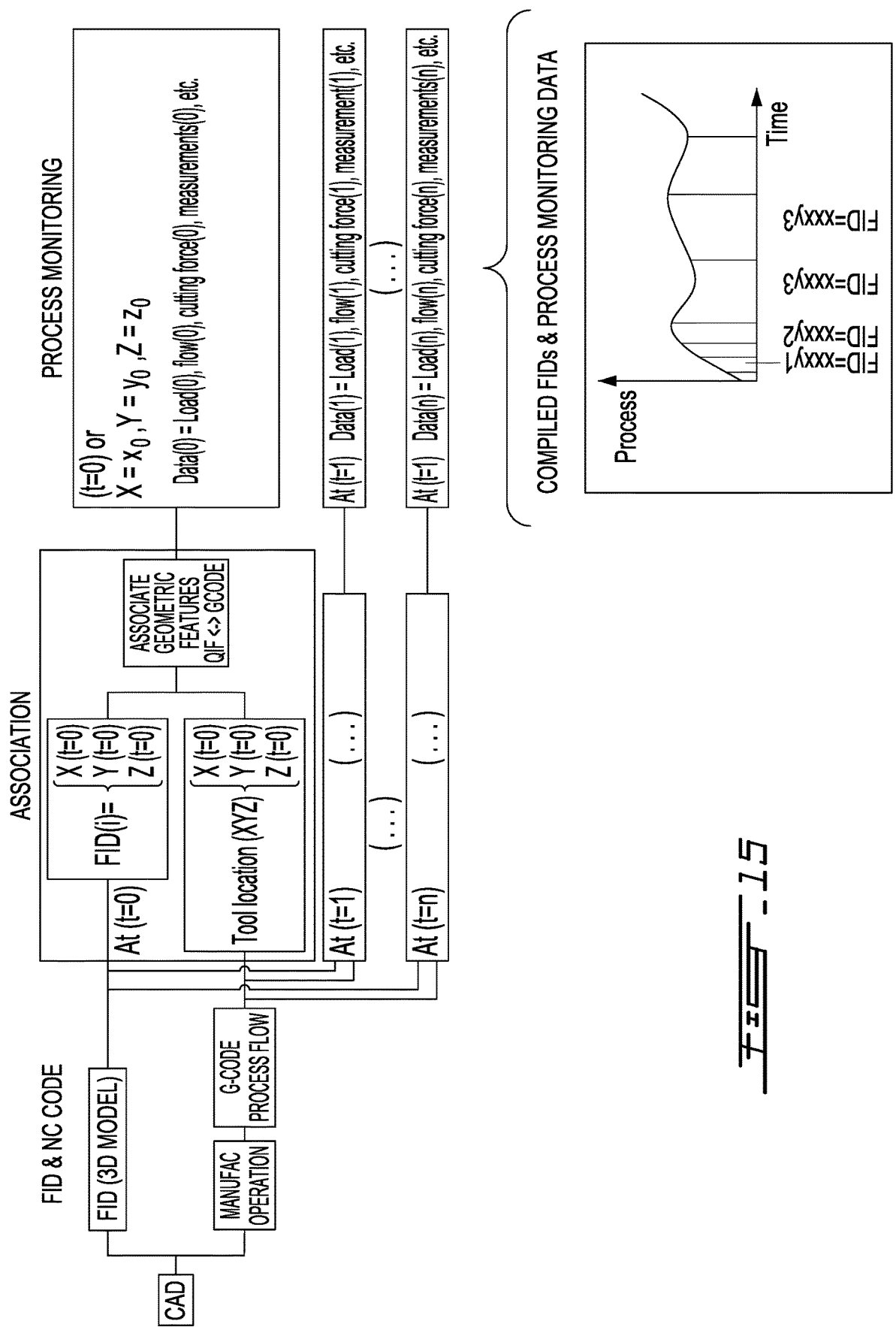
FIG. 15 is a process diagram of an example method of producing manufacturing data.

FIG. 15 presents an example embodiment of a postprocessor flow including process monitoring association in relation to the example presented above.

Figure 16:
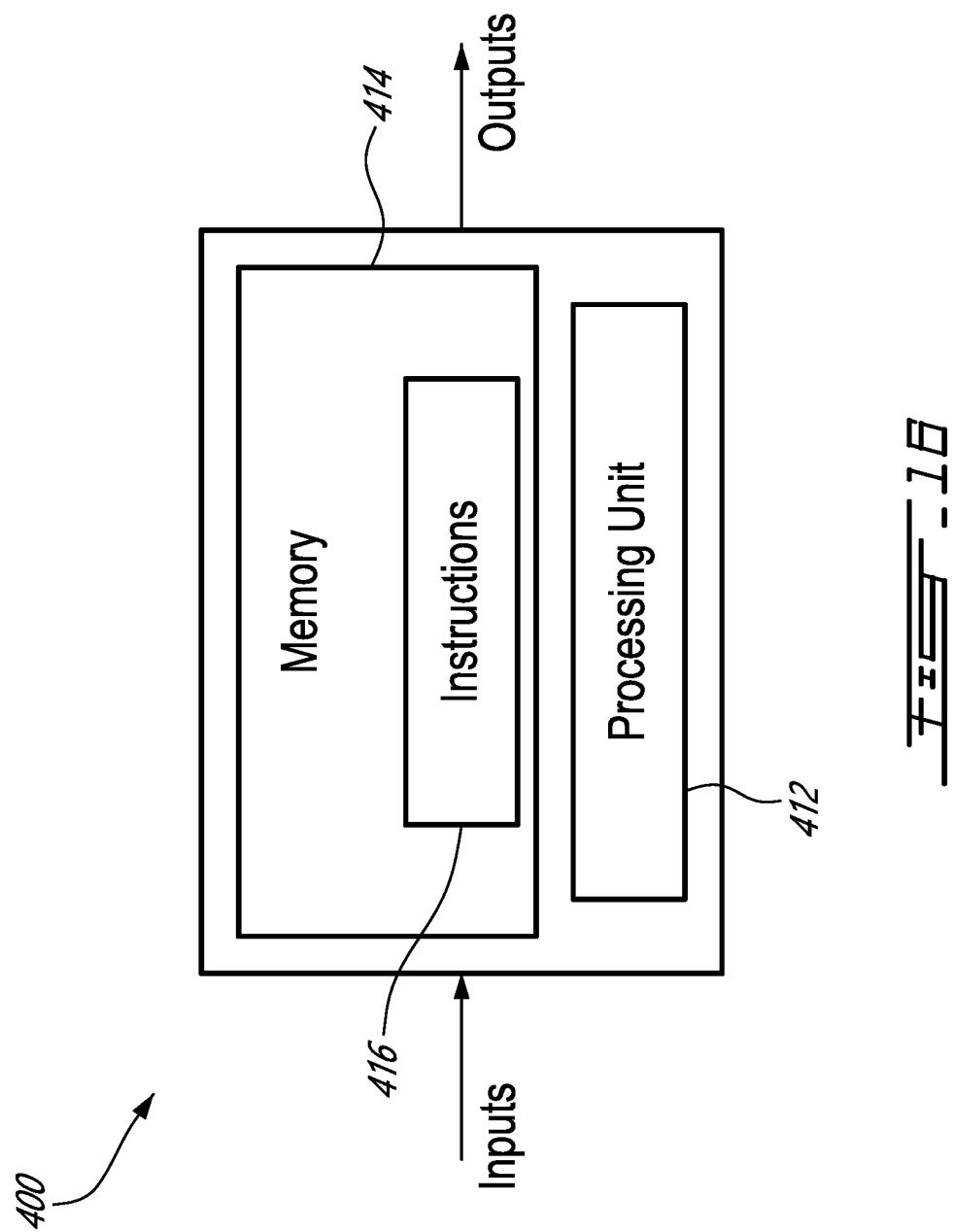
FIG. 16 is a block diagram of a computer.

Referring to FIG. 16, it will be understood that the expression "computer" 400 as used herein is not to be interpreted in a limiting manner. It is rather used in a broad sense to generally refer to the combination of some form of one or more processing units 412 and some form of memory system 414 accessible by the processing unit(s). The memory system can be of the non-transitory type. The use of the expression "computer" in its singular form as used herein includes within its scope the combination of a two or more computers working collaboratively to perform a given function. Moreover, the expression "computer" as used herein includes within its scope the use of partial capabilities of a given processing unit.

A processing unit can be embodied in the form of a general-purpose micro-processor or microcontroller, a digital signal processing (DSP) processor, an integrated circuit, a field programmable gate array (FPGA), a reconfigurable processor, a programmable read-only memory (PROM), an electronic engine controller EEC, a full authority digital engine controller (FADEC), to name a few examples.

The memory system can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

A computer can have one or more input/output (I/O) interface to allow communication with a human user and/or with another computer via an associated input, output, or input/output device such as a keyboard, a mouse, a touchscreen, an antenna, a port, etc. Each I/O interface can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a computer or a processing unit, the expression "configured to" relates to the presence of hardware or a combination of hardware and software which is operable to perform the associated functions. Different elements of a computer, such as processor and/or memory, can be local, or in part or in whole remote and/or distributed and/or virtual.

The methods and systems described herein may be implemented in a high level procedural or object oriented programming or scripting language, or a combination thereof, to communicate with or assist in the operation of a computer system, for example the system controller 68. Alternatively, the methods and systems for operating an on-off valve may be implemented in assembly or machine language. The language may be a compiled or interpreted language. Program code for implementing the methods and systems for operating an on-off valve may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating an on-off valve may also be considered to be implemented by way of a non-transitory computer-readable storage medium having a computer program stored thereon. The computer program may comprise computer-readable instructions which cause a computer, or more specifically the processing unit 412 of the computing device 400, to operate in a specific and predefined manner to perform the functions described herein, for example those described in the method 200 or 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, it will be known to persons having ordinary skill in the art that rather than being extracted from a GCode, data pertaining to tool paths, tool IDs, and sequence references may be extracted from a CAM model prior to postprocessing for NC machine. Yet further modifications could be implemented by a person of ordinary skill in the art in view of the present disclosure, which modifications would be within the scope of the present technology.

The invention claimed is:

1. A system for manufacturing a part, comprising:
   a tool module selectively controllable to execute a sequence of one or more manufacturing process steps to one or more features of the part;
   a monitoring module selectively controllable to generate one or more manufacturing data segments, the one or more manufacturing data segments describing an execution of the sequence of the one or more manufacturing process steps; and
   an associator module in communication with the monitoring module and a non-transitory memory storing instructions, which instructions when executed cause the associator module to construct one or more feature-based manufacturing data items using
   i) sequence data associated to the one or more manufacturing data segments, the sequence data indicating an order of the one or more manufacturing process steps in the sequence, and ii) an associator table having one or more feature identifiers associated to one or more sequence references, the one or more feature identifiers identifying the one or more features, which instructions when executed further cause the associator module to associate the one or more manufacturing data segments with the one or more feature identifiers based on associating the sequence data to the one or more sequence reference.

2. The system of claim 1 wherein the one or more sequence references have one or more temporal references.

3. The system of claim 2 wherein the one or more sequence references include a plurality of sequence references associated to a manufacturing process step, the manufacturing process step associated to a single command.

4. The system of claim 3 wherein the instructions, when executed, cause the associator module to construct a plurality of the one or more feature-based manufacturing data items, including to associate a plurality of the one or more manufacturing data segments describing the execution of the single manufacturing process step with respective ones of the one or more feature identifier.

5. The system of claim 1 wherein the one or more feature-based manufacturing data items include a plurality of feature-based manufacturing data items for the part, the plurality of feature-based manufacturing data items for the part having different ones of the one or more feature identifiers.

6. The system of claim 5 wherein the plurality of feature-based manufacturing data items for the part further includes a part identifier of the part.

7. The system of claim 1 wherein the instructions when executed further cause the associator module to construct the associator table using:
- a computer-aided design (CAD) model of the part including one or more feature geometries of the one or more features of the part, the one or more feature geometries associated to the one or more feature identifiers;
- software instructions including one or more tool paths corresponding to the one or more manufacturing process steps associated to the sequence data and to one or more tool identifiers; and
- one or more tool geometries associated to the one or more tool identifiers; and
- including computing one or more tool locations based on the one or more tool paths and the one or more tool geometries; and
- wherein the instructions when executed further cause the associator module to compare the one or more tool locations and the one or more feature geometries to identify matches, and to associate the one or more feature identifiers to the one or more sequence references based on identified matches and the sequence data.

8. The system of claim 7 wherein said cause the associator module to compare includes cause the associator module to perform an iterative comparison process between each one of the one or more tool locations and the one or more feature geometries.

9. A method of manufacturing a part, the method comprising:
performing a sequence of one or more manufacturing process steps to one or more features of the part;
generating one or more manufacturing data segments describing the sequence of the one or more manufacturing process steps; and constructing one or more feature-based manufacturing data items using
manufacturing data having the one or more manufacturing data segments associated with reference data, the reference data indicating an order of the one or more manufacturing process steps in the sequence, and
an associator table having one or more feature identifier of the one or more features associated to one or more sequence references,
the constructing including associating the one or more manufacturing data segments with corresponding ones of the one or more feature identifiers based on associating the sequence data to the one or more sequence references.

10. The method of claim 9 wherein the one or more sequence references is one or more temporal references.

11. The method of claim 10 wherein the one or more temporal references includes a plurality of temporal references associated to a manufacturing process step, the manufacturing process steps associated to a single command.

12. The method of claim 11 wherein said constructing includes constructing a plurality of the one or more feature-based manufacturing data items, including associating a plurality of the one or more manufacturing data segments describing the execution of the manufacturing process step with respective ones of the one or more feature identifiers.

13. The method of claim 9 wherein the generating is performed while performing the sequence of the one or more manufacturing process steps.

14. The method of claim 9 wherein said constructing includes generating a new feature-based manufacturing data item.

15. The method of claim 9 wherein said constructing includes editing an existing feature-based manufacturing data item to add the manufacturing data segment matching a feature identifier of the existing feature-based manufacturing data item.

16. The method of claim 9 further comprising, subsequently to said associating, deleting any unassociated manufacturing data segment.

17. The method of claim 9 further comprising constructing the associator table using:
a computer-aided design (CAD) model of the part including one or more feature geometries of the one or more features of the part associated to the one or more feature identifier;
software instructions including one or more tool paths corresponding to the one or more manufacturing process steps associated to the sequence data and to one or more tool identifiers; and
one or more tool geometries associated to the one or more tool identifiers;
said constructing the associator table including computing one or more tool locations based on the one or more tool paths and the one or more tool geometries;
comparing the one or more tool locations and the one or more feature geometries to identify matches; and
associating the one or more feature identifiers to the one or more sequence references based on identified matches and the sequence data.

18. The method of claim 17 wherein said comparing includes performing an iterative comparison process between each one of the one or more tool locations and the one or more feature geometries.

19. A method of improving a manufacturing process, the method comprising:

receiving tool path data including one or more tool paths corresponding to a sequence of one or more manufacturing process steps to be executed to one or more features of a part, the one or more tool paths associated to sequence data, the sequence data indicating an order of the one or more manufacturing process steps in the sequence;

receiving tool geometry data including one or more tool geometries associated to the one or more tool paths;

receiving feature geometry data including one or more feature geometries of the one or more feature of the part associated to one or more feature identifiers of the one or more features;

computing one or more tool locations based on the one or more tool paths and the one or more tool geometries; and constructing an associator table including
comparing the one or more tool locations and the one or more feature geometries to identify matches; and
associating the one or more feature identifiers to the one or more sequence references based on the matches and the sequence data.

20. The method of claim 19 wherein said comparing includes performing an iterative comparison process between each one of the one or more tool locations and the one or more feature geometries.

\* \* \* \* \*